(12) United States Patent
Kracker et al.

(10) Patent No.: US 9,379,567 B2
(45) Date of Patent: Jun. 28, 2016

(54) SELECTIVE CURRENT REDUCTION ENABLED WITH ELECTRICALLY DEACTIVATED KEY FOB

(71) Applicant: Honda Motor Co., Ltd., Tokyo (JP)

(72) Inventors: Thomas G. Kracker, Raymond, OH (US); Brian K. Lickfelt, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 243 days.

(21) Appl. No.: 14/346,609

(22) PCT Filed: Sep. 24, 2012

(86) PCT No.: PCT/US2012/056893
§ 371 (c)(1),
(2) Date: Mar. 21, 2014

(87) PCT Pub. No.: WO2013/044221
PCT Pub. Date: Mar. 28, 2013

(65) Prior Publication Data
US 2014/0232322 A1 Aug. 21, 2014

Related U.S. Application Data

(60) Provisional application No. 61/538,203, filed on Sep. 23, 2011.

(51) Int. Cl.
*H02J 7/00* (2006.01)
*B60R 16/00* (2006.01)
*G07C 9/00* (2006.01)

(52) U.S. Cl.
CPC ............... *H02J 7/0054* (2013.01); *B60R 16/00* (2013.01); *G07C 2009/00587* (2013.01)

(58) Field of Classification Search
CPC ....................................................... H02J 7/0054
USPC ................................................................ 320/103
See application file for complete search history.

(56) References Cited

U.S. PATENT DOCUMENTS 5,491,486 A * 2/1996 Welles, II ............. G01S 5/0009
  342/357.74
5,844,325 A * 12/1998 Waugh ................ H01M 10/122
  307/10.7

(Continued)

FOREIGN PATENT DOCUMENTS

DE  10 2009 033309   1/2001
DE     199 34 708    2/2001
DE  10 2004 023197  12/2005

OTHER PUBLICATIONS

The International Search Report and Written Opinion as mailed on May 10, 2013 for International Application No. PCT/US2012/056893.

*Primary Examiner* — Sun Lin
(74) *Attorney, Agent, or Firm* — Arent Fox LLP

(57) ABSTRACT

Smart key fob with an integrated rechargeable battery and a replaceable battery. Transfer of charge from the replaceable battery to the rechargeable battery is configured to occur only during a period of time when the key fob remains motionless to reduce RF interference with polling operation of the key fob's transceiver to determine presence of the mother-vehicle nearby. Optionally, the poling operation of the transceiver is reduced or ceased during periods of motionlessness of the key fob.

15 Claims, 6 Drawing Sheets

(56) References Cited

U.S. PATENT DOCUMENTS

| | | | | |
|---|---|---|---|---|
| 6,713,895 B1 * | 3/2004 | Krapfl | ................ | G07C 9/00944 307/10.1 |
| 7,527,288 B2 * | 5/2009 | Breed | ................... | B60R 21/013 280/735 |
| 7,672,756 B2 * | 3/2010 | Breed | ................... | G07C 5/008 701/1 |
| 8,258,748 B2 * | 9/2012 | Constien | ............ | G01R 31/3679 320/127 |
| 8,912,884 B2 * | 12/2014 | Fisher | ................ | G07C 9/00571 235/382 |
| 9,002,416 B2 * | 4/2015 | Alameh | ................ | G06F 1/1626 340/5.61 |
| 2006/0238314 A1 | 10/2006 | Minassian et al. | | |
| 2008/0088412 A1 | 4/2008 | Cromer et al. | | |

* cited by examiner

SELECTIVE CURRENT REDUCTION ENABLED WITH ELECTRICALLY DEACTIVATED KEY FOB

CROSS-REFERENCE TO RELATED APPLICATIONS

The present application represents the U.S. National Stage of International Application No. PCT/US2012/056893, filed Sep. 24, 2012 which claims priority to U.S. Provisional Patent Application No. 61/538,203 filed on Sep. 23, 2011 and titled "Selective Current Reduction Enabled with Electrically Deactivated Key Fob." Disclosure of the above-identified provisional patent application is incorporated by reference herein for all purposes.

TECHNICAL FIELD

The disclosure relates in general to vehicular systems and, more particularly, to an electronic device enabled to execute a charging routine scheduled to reduce an amount of radio frequency interference generated by the key fob during its communication with the vehicle and cease its operation, depending on its operational status, to conserve electrical energy.

BACKGROUND

More and more vehicles nowadays are provided with key fobs that are configured to control a number of vehicular electronic systems. Some non-limiting examples of automotive functions that can be controlled by a key fob include those provided by security systems (such as door lock/unlock, security system arm/disarm, and the like), remote engine starting systems, trunk and door opening systems.

To provide electrical energy for their operation, some key fobs include multiple batteries. One configuration, for example, includes a rechargeable battery that is used to power the operations of the key fob as well as a replaceable battery. During normal operation, the rechargeable battery is relied upon to power the key fob. As the rechargeable battery becomes depleted, energy from the replaceable battery is used to replenish the rechargeable battery. This transfer of energy between batteries can sometimes cause the key fob to radiate radio frequency signals that can interfere with the normal operations of the key fob.

Accordingly, there exists a need of overcoming the above-identified problem by providing a vehicular key fob adapted to minimize battery consumption resulting from continual and/or continuous polling of the vehicle and to minimize lower frequency transmission that may interfere with that process.

SUMMARY

The disclosure relates in general to electronic key fobs and, more particularly, to a vehicular key fob executing a charging routine configured to reduce an amount of radio frequency interference generated by the key fob. Embodiments of the invention provide a system comprising a vehicular key fob that includes a first rechargeable electrical battery integrated in the key fob, a second replaceable electrical battery, electrical circuitry operably connecting the first and second electrical batteries, and a processor programmed to govern the electrical circuitry to charge the first electrical battery from the second electrical battery only at a time period when the vehicular key fob is stationary. In particular, the processor may be programmed to effectuate charging of the first electrical battery from the second electrical battery only when the vehicular key fob has been unceasingly stationary for a period of time equal to or exceeding a predetermined threshold duration.

An embodiment of the system may additionally include a motion detection unit (also referred to as motion sensor) integrated therewith and configured to generate output data informative of a change in at least one of position and orientation of the vehicular key fob, while the processor may be programmed to govern the electrical circuitry in response to the output data received from the motion detection unit. Furthermore, the system may contain a transceiver in operable communication with the motion detection unit, while the processor is programmed to change an operational status of the transceiver in response to the output data received from the motion detection unit. Alternatively, the system may contain a transceiver in operable communication with the motion detection unit, while the processor is programmed to govern the electrical circuitry to substantially prevent the transceiver from operating in response to the output data received from the motion detection unit and indicative of lack of motion of the vehicular key fob.

Embodiments described in the present disclosure further provide a method for charging a first battery of a vehicular key fob having a processor and a transceiver associated therewith. The method includes receiving, with the processor, data that represents status of motion of the vehicular key fob. The method further includes operating electrical circuitry of the vehicular key fob to effectuate one or more of (i) transferring of electrical charge from a second battery to the first battery when the data indicates that the vehicular key fob has been stationary for a period of time longer than or equal to a threshold duration; and (ii) preventing a transfer of charge from the second battery to the first battery when said data indicates that the vehicular key fob is moving.

Embodiments described in the present disclosure additionally provide a vehicular system including a vehicle that has a communication unit adapted to transmit a radio signal identifying the vehicle, and an electronic device autonomously powered by a first battery and equipped with electronic circuitry. The electronic circuitry is adapted to poll said radio signal to determine proximity of said electronic device to said vehicle and, when a period of unchanged operational status of the electronic device exceeds a predetermined duration, effectuate at least one of (i) transferring electrical charge to said first battery, and (ii) ceasing the polling of said radio signal.

DETAILED DESCRIPTION

Figure 1:
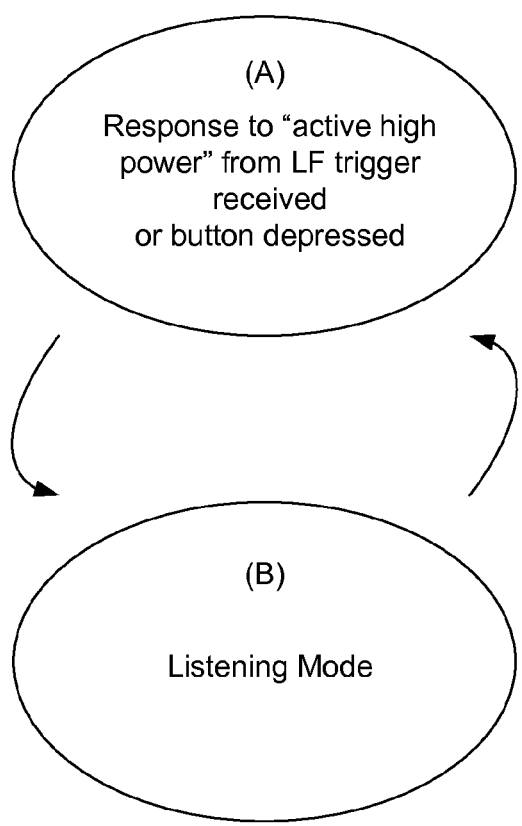
FIG. 1 is a diagram illustrating modes of operation of a commonly used key fob.

The disclosure relates in general to electronic key fobs and, more particularly, to a vehicular key fob adapted to be deactivated depending on its operational status, as well as an improved battery charging routine for such electronic key fob that facilitates reduction of radio frequency (RF) interference.

References throughout this specification to "one embodiment," "an embodiment," "a related embodiment," or similar language mean that a particular feature, structure, or characteristic described in connection with the referred to "embodiment" is included in at least one described embodiments. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all related features.

In addition, the following disclosure may describe features of the described embodiments with reference to corresponding drawings, in which like numbers represent the same or similar elements wherever possible. In the drawings, the depicted structural elements are generally not to scale, and certain components are enlarged relative to the other components for purposes of emphasis and understanding. It is to be understood that no single drawing is intended to support a complete description of all related features. In other words, a given drawing is generally descriptive of only some, and generally not all, features. A given drawing and an associated portion of the disclosure including a description referencing such drawing do not, generally, include all elements of a particular view or all features that can be presented is this view, for purposes of simplifying the given drawing and discussion, and to direct the discussion to particular elements that are featured in this drawing. A skilled artisan will recognize that an embodiment may possibly be practiced without one or more of the specific features, elements, components, structures, details, or characteristics, or with the use of other methods, components, materials, and so forth. Therefore, although a particular detail of a given embodiment may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment that are being discussed. Furthermore, the described single features, structures, or characteristics may be combined in any suitable manner in one or more further embodiments.

Moreover, if the schematic flow chart diagram is included, it is generally set forth as a logical flow-chart diagram. As such, the depicted order and labeled steps of the logical flow are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Without loss of generality, the order in which processing steps or particular methods occur may or may not strictly adhere to the order of the corresponding steps shown.

The scope of recitations in claims appended to this disclosure is intended to be assessed in light of the disclosure as a whole, including features disclosed in prior art to which reference is made.

The operation of a key fob in most of the cases requires physical activation by a user (for example, a user has to push a particular button on the key fob, which acts as a trigger of a particular function controlled by the key fob). However, newer key fob devices also allow a key fob to interact with one or more vehicle systems autonomously. For example, a so-called "smart" key fob can detect the proximity of a particular vehicle to the key fob (or, alternatively, the vehicle can detect the proximity of a particular key fob). Once the key fob is detected to be nearby the vehicle, the vehicle can undertake certain actions, such as causing the security system to unlock the vehicle. Such "smart" communication between the key fob and the vehicle allows a user to unlock a vehicle simply by carrying a smart key fob, as well as for "hands free" entry into the vehicle. Additional examples of vehicle functions that can be controlled based upon the proximity of a smart key fob include the automatic switching off or on of vehicle puddle lights and/or lighting that operates to assist the user in entering the vehicle.

To enable a key fob with "smart" operational functionality, the key fob is equipped with means that allow the key fob to periodically attempt to communicate with a vehicle, either by detecting a wireless signal transmitted by a vehicular transmitter, or by transmitting a wireless signal to a vehicular receiver. Such operation may be referred to as polling (in some cases it is referred to as low frequency (LF) polling). For example, if the predetermined wireless polling signal is transmitted by a dedicated vehicular system and successfully received by the key fob, that indicates that the key fob and corresponding vehicle are in close proximity to one another. Conversely, if the signal was transmitted by the vehicular system but not successfully received by the key fob, the key fob determines that the vehicle and the key fob are not in proximity to one another (for example, outside of the LF polling detection range).

In reference to the diagram of FIG. 1, such continuous and/or continual transmission (or attempts to receive) wireless communication signals activity between the vehicle and the key fob consumes a large amount of electrical energy. While the key fob itself spends a small portion of its life time in the "active high power" mode, about 50% of the total battery life time is spent in this mode. At the same time, the "listening mode" occupies most of the key fob lifetime and about 50% of the lifetime of the battery. The energy consumption may become problematic in a key fob, which, due to a need to keep the key fob's size and/or shape under certain constraints is configured to accommodate only a small electrical battery (or batteries). By constantly undergoing this wireless signal polling to identify whether the corresponding vehicle is nearby, the key fob's battery is quickly drained, thereby requiring the user to replace the battery more regularly than desired and sometimes at an inconvenient moment.

The present disclosure provides a key fob configured to minimize battery consumption and/or minimize RF interference that may be generated by the key fob and that could interfere with the key fob's normal operations. In various embodiments the key fob may include a key fob for car-entry and car-starting, and/or an electronic device such as a portable security token, portable electronic device and the like, configured to communicate wirelessly with another system, such as a microcontroller operating within a vehicle. The present key fob is configured to enter a sleep mode upon the detection of a particular set of environmental conditions (i.e., a lack of movement over a given amount of time). The sleep mode enables the key fob to not conduct any LF polling, thereby facilitating energy conservation, increasing the lifetime of the battery powering the key fob, and reducing potential RF interference due to smaller percentage of time during which the key fob produces RF radiation.

Conventionally, a smart key fob detects its being in proximity to the target vehicle by periodically attempting to decode a polling signal transmitted by the target vehicle throughout a detection zone or range within which the key fob can received it. The size of the zone is determined by the strength of the polling signal and the sensitivity of the key fob's communications system to the polling signal. If the key fob enters the detection range, the key fob will receive the polling signal from the vehicle. The key fob then sends a response signal back to the target vehicle to acknowledge that the key fob is within range of the target vehicle. The target vehicle receives the key fob's response signal and can, in response, undertake certain predetermined actions. An LF polling event may be triggered by the user activity, such as, for example, grabbing the car door handle and/or press of the car start button.

In some cases, the vehicle performs additional analysis of the strength of the received signal as further confirmation of the distance between the key fob and the target vehicle, for example, using a received signal strength indication (RSSI). It is appreciated that such continuous monitoring causes the battery of a conventional key fob to be relatively quickly depleted, causing the user to constantly replace the batteries and/or repeatedly recharge the device.

Figure 2:
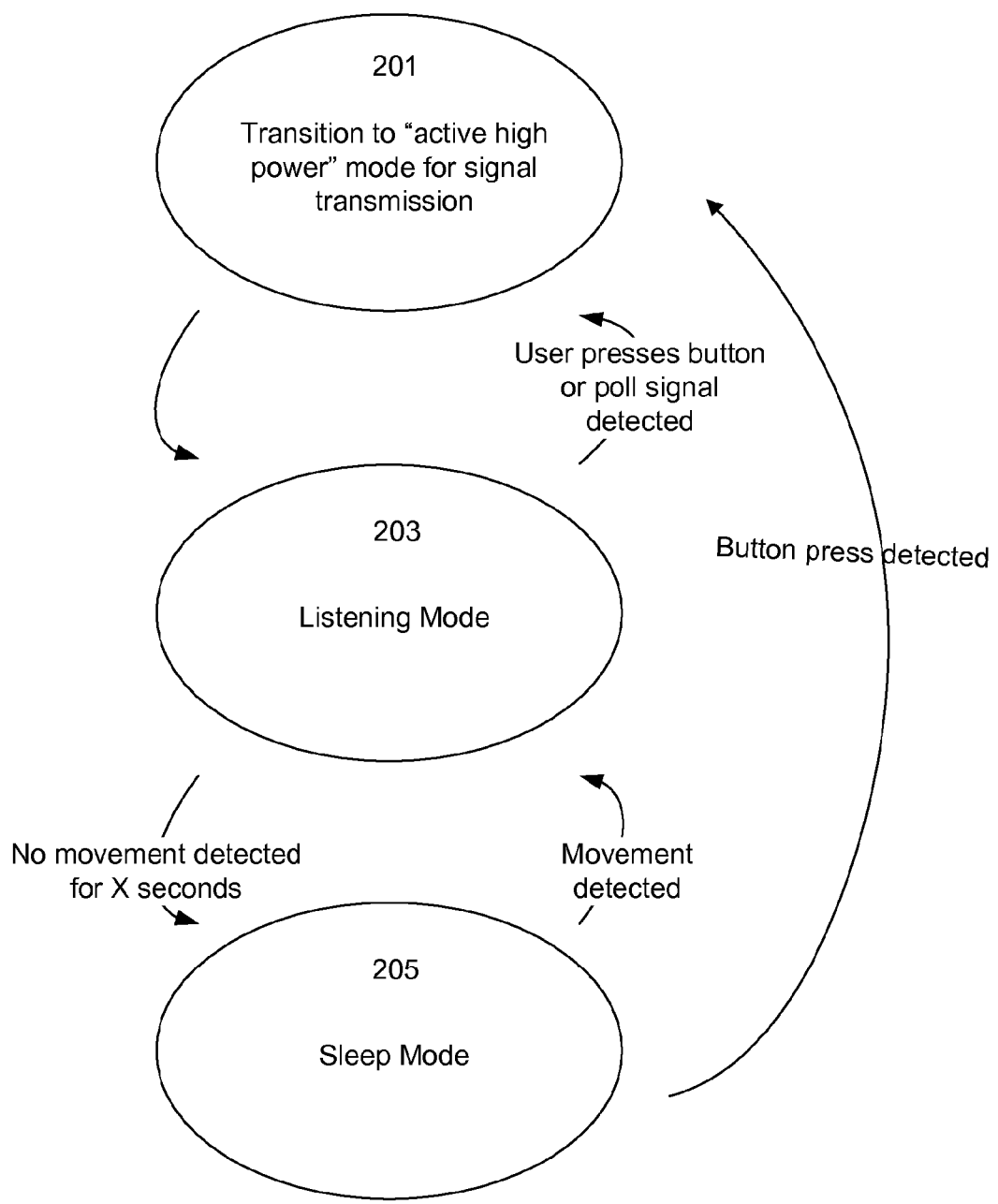
FIG. 2 is a flowchart showing modes of operation of an embodiment of the present disclosure.

FIG. 2 is a flowchart showing the modes of operation of the present key fob. Referring to FIG. 2, mode 203 refers to the key fob during normal operation. The key fob is constantly monitoring for a polling signal transmitted by a corresponding vehicle, as described above. Because this mode involves normal operations the key fob consumes a relatively high amount of battery power in this mode.

While in listening mode, if the user pushes a button on the key fob, or if the key fob detects the polling signal, the key fob will transition to mode 201, in which the key fob actively communicates with the corresponding vehicle by transmitting an appropriate wireless signal to the vehicle. This mode of operation uses a lot of energy as the key fob is actively communicating with the vehicle.

After transmitting the necessary signal associated with mode 201, the key fob will transition back to mode 203. In some implementations, however, after successfully communicating with the vehicle in response to a button press or detection of a polling signal, the key fob may be placed directly into sleep mode 205, as described below.

While in listening mode 203, the key fob is also configured to detect motion of the key fob. As discussed below, the key fob includes an accelerometer or other motion detector to sense when the key fob is experiencing movement. If the key fob is moving, that indicates the key fob is being carried by a user. Therefore, the key fob is in use and should remain in listening mode. If, however, while operating in mode 203 the key fob determines that motion has not been detected for a predetermined period of time (e.g., 30 seconds, 2 hours, 4 hours, and the like), the key fob will transition into sleep mode 205. While in sleep mode 205 the key fob does not perform any polling activity allowing the key fob to utilize only a minimal amount of energy. While in sleep mode 205, however, as described below, the key fob uses an accelerometer or other motion sensor to detect whether the key fob is moving. This allows the key fob, for example, to remain in sleep mode while the key fob has been placed upon a table or put on a shelf while the key fob is not in use. This allows the key fob to be in sleep mode while the key fob is not needed and not in use.

However, upon detecting movement (indicating that the key fob has been picked up and is now in use), the key fob transitions into listening mode 203 and undertakes normal operation. The detection of movement, for example, may indicate that the key fob has been picked up and placed into an individuals pocket or purse and is, therefore, being used. Additionally, if the key fob is in sleep mode 205 and detects a button press, the key fob will transition directly into active mode 201 in order to transmit the signal associated with the button press.

In summary, therefore, the key fob device is configured to enter a "sleep" mode when the key fob is not in use (for example, when the key fob is not being carried by an individual but is stored or still, with its position and/or orientation kept unchanged). When in the sleep mode, the electronic circuitry of the key fob is configured to not undertake polling operations (i.e., the key fob will not monitor for the polling signal or transmit any related signals). As a result, during the "sleep" mode, the key fob consumes a reduced amount of electrical energy. At the same time, when the key fob is in use (for example, when it is being carried by an individual), the electronic circuitry activates an "awake" mode during which the key fob operates conventionally, by monitoring for the polling signal for as long as the "awake" mode lasts. By utilizing the sleep mode during periods of disuse of the key fob, the key fob spends less time in mode 203, and a higher percentage of its life in mode 205 thereby reducing power consumption when it is appropriate.

Figure 3:
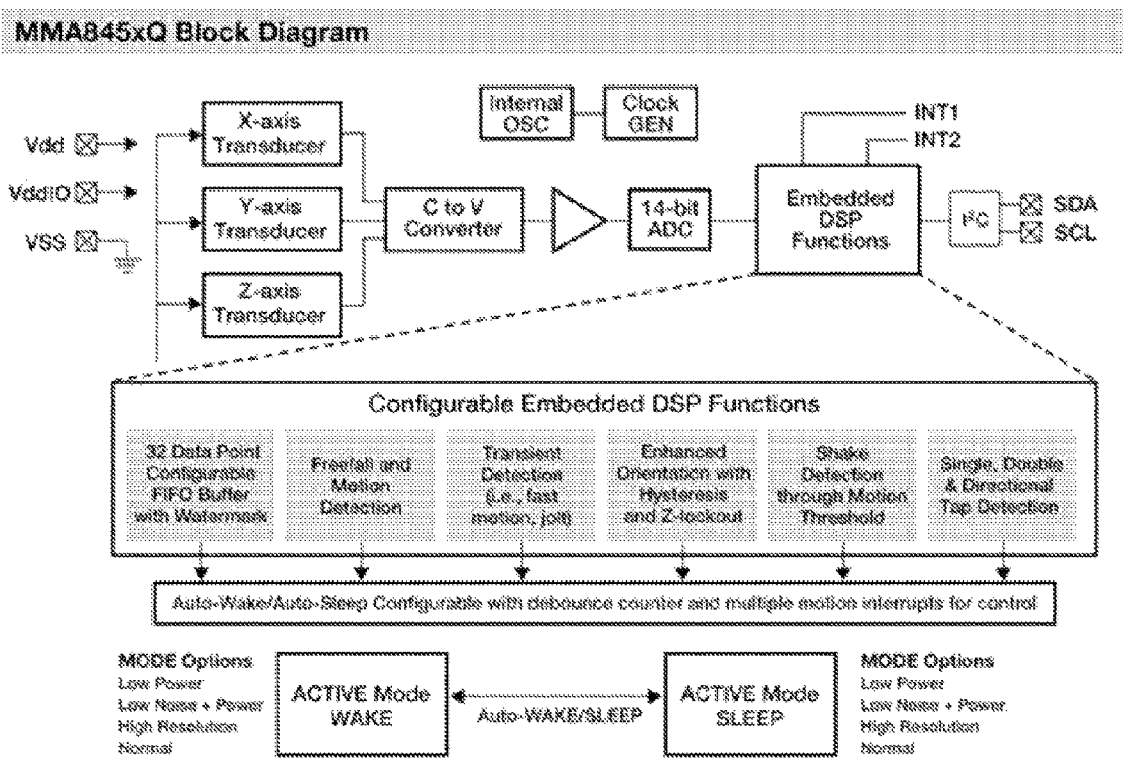
FIG. 3 is a block-scheme of an example of a motion detection unit for use with an embodiment of the invention.

To distinguish between the "sleep" and "awake" modes, the electronic circuitry of the key fob includes a motion detector unit, in response to the output data from which a processor associated with the key fob is programmed to execute a number of routines and/or methods to activate the key fob into a "sleep" or "awake mode". For example, a low-current-drawing 3-axes electronic accelerometer element, the block-diagram of which is shown in FIG. 3, can be embedded into a key fob to allow the key fob to detect a change in operational environment and generate a triggering signal in response to which a microprocessor, associated with the key fob, enables the changes of the key fob status with the use of appropriate electronic circuitry. Examples of detectable change in operational environment include the change in position and/or orientation of the key fob cased, for instance, by user's leaving the key fob motionless on the table or in the bag while not using the vehicle.

Figure 4:
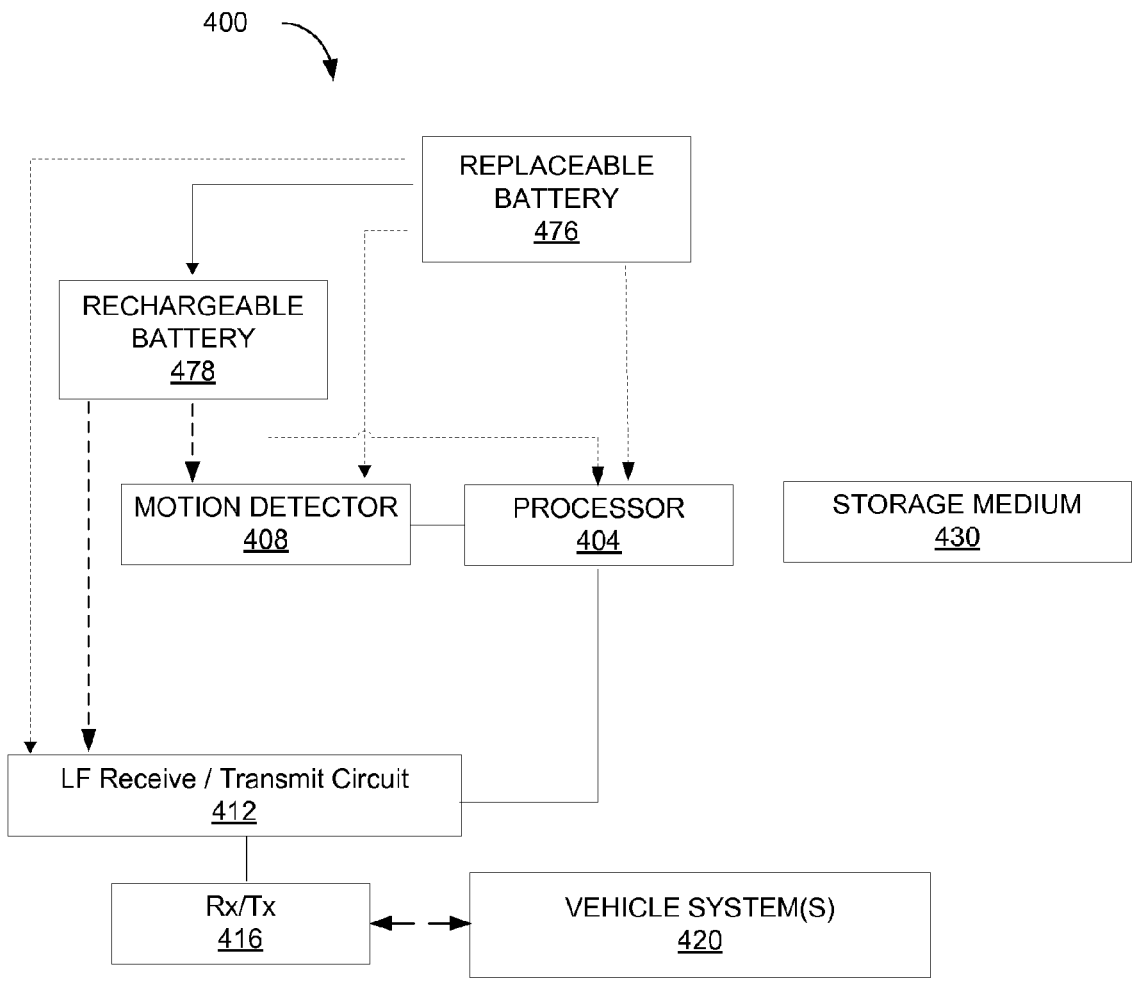
FIG. 4 is a diagram illustrating the operable cooperation among components of a vehicle including an embodiment of the key fob of the invention.

FIG. 4 illustrates schematically a network 400 of components included in an embodiment of the present key fob. For example, a processor 404 is programmed, in response to a voltage and/or current output data from the motion detector unit 408 (including the accelerometer element indicating that a key fob has not been moving for a predetermined amount $T_1$ of threshold time, or that the orientation of the key fob in space has not been changed for such threshold duration $T_1$ of time), to switch off the electronic circuitry 412 controlling an RF transceiver 416 of the key fob (i.e., to enter a "sleep" mode). Alternatively, the processor 404 may be programmed to enable such circuitry 412 to enter a "low power" (or power conservation) mode. After such switch-off/reduction of power consumption event occurs, the transceiver 416 ceases to communicate with a corresponding system 420 of the vehicle and to poll the positioning of the key fob with respect to the system 420.

Alternatively or in addition, the processor 404 can be programmed to switch on the circuitry 412 (in the case when the circuitry 412 was switched off) or return it to providing full power to the transceiver 416, thereby altering the operation status of the transceiver 416 from the "sleep" mode to the "awake" mode. Such switch of status of operation of the key fob can be implemented in response to detection, by the motion detector unit 408, that a change in spatial orientation and/or positioning occurred after a predetermined duration of time $T_2$ of the "sleep" mode lapsed. Any of data associated with change in operational status of key fob can be optionally stored or recorded in a data base (such as that including tangible and optionally computer-readable medium) 430. In a related embodiment (not shown), such data base or data storage may be integrated with the vehicle itself, in which case data transfer between the processor 404 and the data base is configured wirelessly.

The key fob can be configured to change its operational status from "sleep" to "awake" in response to a user input provided, for example, through a key-fob user interface (UI) including a button or switch (of mechanical, haptic, piezoelectric, biometric, or other functional nature) on the key fob at user's discretion.

In one embodiment of the key fob, the "sleep" and "awake" modes of the key fob are further used by the key fob to control a charging routine of an internal battery within the key fob, as described below. By only charging the battery when the key fob is in the "sleep" mode, RF interference generated by the charging routine that could otherwise interfere with the key fob's normal modes of operation is at least reduced and, optionally, avoided.

The above operation of an embodiment of the present key fob enables the key fob, over its lifetime, to use less energy. Accordingly, the present key fob is enabled to use either a smaller battery (which widens styling and/or packaging options for the key fob) or, alternatively, to use the battery of a conventional size for a longer time. When a smaller-size battery is used, the key fob may include, together, two or more batteries one of which resides in the key fob permanently and the second one being replaceable. In that case, the electronic circuitry of the key fob may include a dedicated "charge pump" circuitry unit that is triggered by the processor to detect that the first permanent battery is significantly depleted and to initiate a process of re-charging of the first, permanently disposed battery from the second, replaceable battery. Unfortunately, this charge replenishment activity can generate RF radiation that can interfere with the key fob's normal operation. Accordingly, in the present embodiment, the charge top-up routine during which the first battery is being re-charged from the replaceable battery is initiated only during the "sleep" mode (i.e., when the key fob is neither transmitting nor receiving RF signals), to ensure that any RF interference with the active operation of the key fob polling the signals from the vehicular system is minimized.

With reference to FIG. 4, in such an implementation the embodiment 400 of a 2-way key fob has a coin cell battery 476 (such as a 3 V battery, for example) and an additional rechargeable battery 478 (for example, a 3.3 V battery). Rechargeable battery 478 supplies a higher-level current to the key fob to enable the sending of a wireless signal representing a long-range transmission signal of the system. The charge circuit unit (which may be part of the circuitry 412 or may be a separate electronic circuitry scheme) is configured to increase or "boost" the voltage of the coin cell battery to the voltage level required for recharging the rechargeable battery. The charging unit (which may include a switching circuit or charge pump circuitry) may produce LF/RF emissions at some frequencies (for example, at about 500 kHz), which may decrease the operational sensitivity of the smart key fob during normal operations (see, for example, mode 203 of FIG. 2), leading to a miss in reception and/or failure to recognize an LF-request for the car entry and reducing the quality of the operation of the overall system.

In one implementation, data acquired from the motion detection unit and representing the state of motion of the key fob can be electronically filtered to ensure that the operation(s) associated with the key fob, as discussed above, are not subject to noise. For example, a predetermined threshold level of current and/or voltage can be established against which the electronic circuitry measures the value(s) of current and/or voltage generated by the motion detection unit. Changed in the motion status of the key fob that result in the motion sensor output below this pre-determined threshold level are not taken into account for the purposes of changing the operational status of the key fob. As a result, infinitesimal or tiny movements of the key fob (caused, for example, by a mechanical vibration of the table on which the key fob is resting) will not affect the key fob status. Instead, only the motion causing an electronic output from the motions sensor to exceed such threshold is taken into account to make a decision about In a related implementation, the definition and use of such motion threshold level is optionally complemented with setting and using a temporal threshold system. Specifically, the electronic circuitry and/or processor of the key fob may be adapted to ensure that not only the motion triggering the change of operational status of the key fob exceeds a certain level, but also that such threshold-exceeding motion lasts longer than a predetermined temporal-threshold duration. In that case, incidental shake-ups of a key fob and/or accidental dropping of the key fob on the floor will not necessarily trigger the "awake" mode of the key fob operation.

In another related embodiment, the combined operation of the smart key fob o and the corresponding vehicle is coordinated and programmed such as to prevent the user from not only accidentally locking the key fob inside the vehicle but also from letting the key fob left inside the vehicle from doing into the "sleep mode". If the results of the LF polling indicate that the key fob is inside the vehicle, at no time when the key fob remains there will the "sleep" mode be activated. For example, in response to the driver's closing the door of the car, the system is enabled to do an interior LF search ("Fob in Car" or "Fob Entering Car") and disables the sleep mode.

Figure 5A:
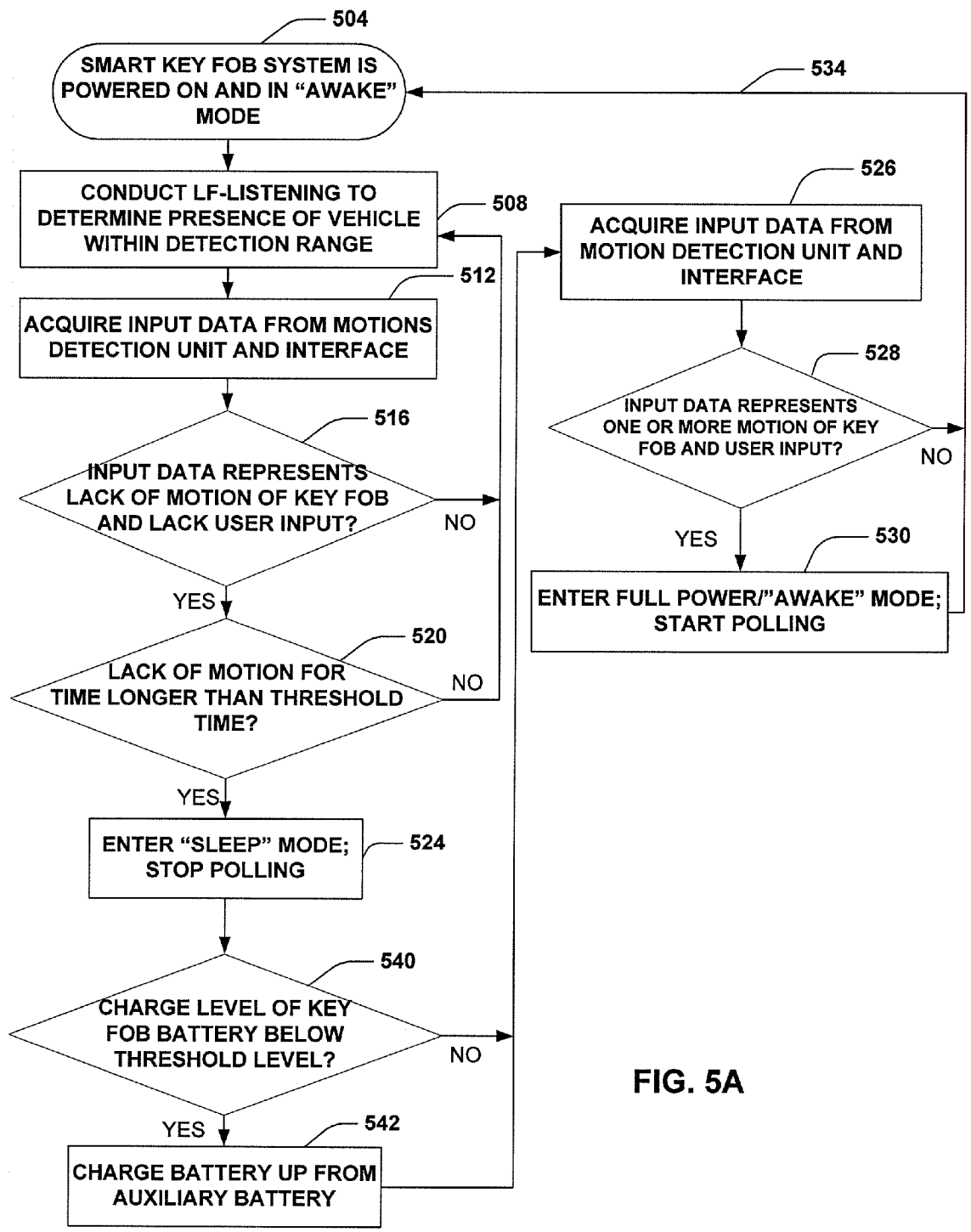
FIGS. 5A and 5B are flow-charts illustrating examples of the method for (re)-charging a battery of the key fob and operation of the key fob according to an embodiment of the invention.

FIG. 5A is a flowchart showing an example of the method for operating a vehicle configured for operation with an embodiment of the key fob.

At step 504, when the key fob is powered on, the transceiver of the key fob initiates or continues (depending on the previous operational state of the transceiver) a polling procedure to detect, at step 508, whether the associated vehicle is present nearby. In doing so, the key fob system receives data from the motion detection unit of the key fob, at step 512, which provides an indication of the operational status of the key fob (e.g., whether the key fob is currently moving). If the data acquired from the motion detection indicates, at steps 516, 520, that the key fob has both been motionless for a predetermined period of time and not received a user input directed at the key fob (for example, in the form of pressing a button on the key fob), then the electronic circuitry is directed to put the key fob in a "sleep" mode and make the transceiver of the key fob cease the polling activity. This occurs at step 524. (However, if either of these conditions is not satisfied, the polling activity of the key fob continues.) When the data acquired from the motion detection unit in the "sleep" mode, continued at step 526 according to a pre-determined algorithm, results in a determination, at step 528, that either the key fob is moved or, an addition or alternatively, the user applied an input to the UI of the key fob, the processor directs the electronic circuitry of the key fob to wake the key fob up and/or direct the full required amount of electrical power to the transceiver, step 530. In the newly initiated "awake" mode, the key fob resumes its polling operation, step 534.

Figure 5B:
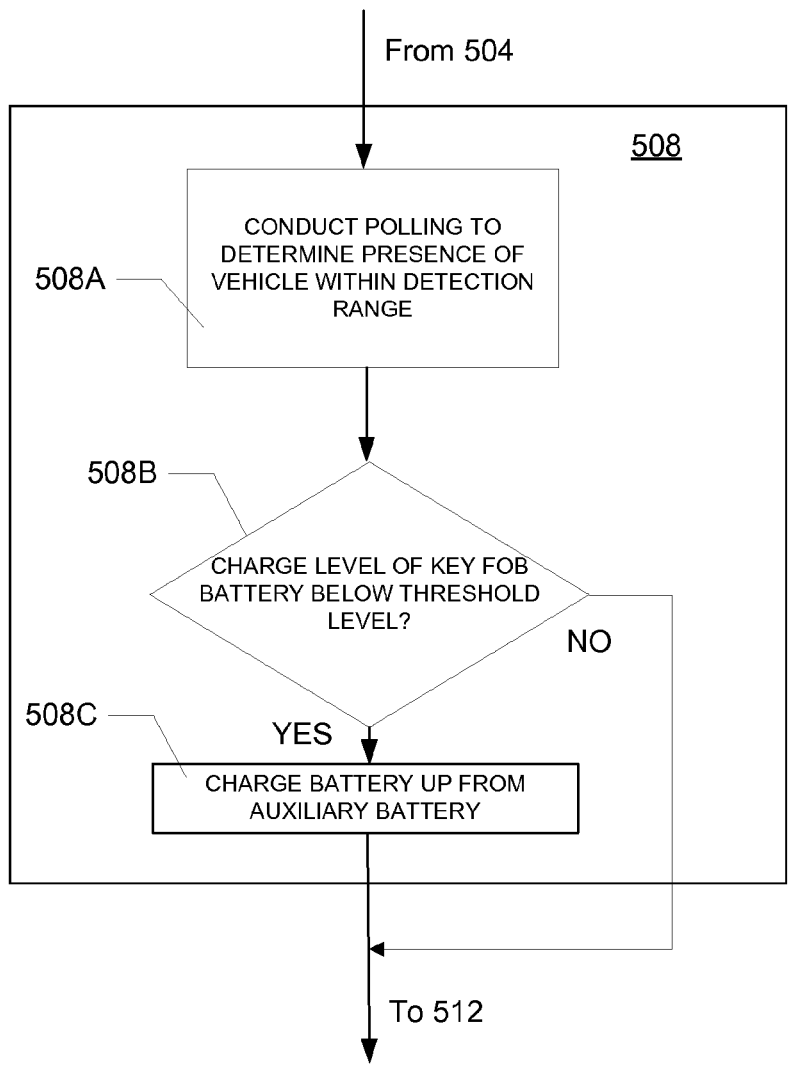

It is appreciated that, whether in a "sleep" mode or in "awake" mode, the primary battery of the key fob may deplete, and a top-up or recharge of the battery at that point may be required. Accordingly, and in further reference to FIG. 5A, an optional re-charge query may be conducted at step 540 and following the entry of the "sleep" mode, followed by pumping up the main battery when the charge level has fallen below a pre-determined threshold. A similar query may be conducted at any time during the continuous operation in the "awake" mode. For example, and in further reference to FIG. 5B, such query and/or recharge may be implemented as part of step 508 of FIG. 5A, at sub-steps 508B, 508B, respectively, following the polling procedure in the "awake" mode at sub-step 508A. Optionally, either of the queries 540 of FIGS. 5A and 508B of FIG. 5B and corresponding battery recharges can be implemented in a loop fashion, so that the charge status of the key fob battery is evaluated periodically.

Implementation of the method (an example of which has been described in reference to FIGS. 5A, 5B) requires the operation of a processor (such as the processor 404 of FIG. 4) controlled by instructions stored in a memory. The memory may be random access memory (RAM), read-only memory (ROM), flash memory or any other memory, or combination thereof, suitable for storing control software or other instructions and data. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the discussed embodiments may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while an embodiment may be implemented in software, the functions necessary for such implementation may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components. As a result, one embodiment may include a computer program product for charging a first battery of a vehicular key fob (which includes a transceiver, an electronic circuitry operable to govern an operation of said transceiver, and a processor in electrical communication with said electronic circuitry). Such computer program product may include a computer usable tangible medium having computer readable program code thereon, which computer readable program includes, in turn program code for generating data, with the use of the processor, that are indicative of a status of motion of the vehicular key fob; and program code for enabling the electronic circuitry to transfer electrical charge from an auxiliary battery to the first battery when the generated data indicates that the key fob is motionless and cease such transfer of electrical charge when the generated data indicates that the key fob is moving. The computer readable program optionally further includes program code for generating the data based on data representing acceleration of the key fob. Alternatively or in addition, the computer readable program further includes program code for enabling the electronic circuitry to cease an operation of the transceiver when the generated data indicates that the key fob is motionless and cease such transfer of electrical charge when the generated data indicates that the key fob is moving.

A person of skill in the art will recognize that changes may be made in form and detail, and equivalents may be substituted for elements of the described embodiments without departing from the intended spirit and scope of the invention. Therefore, it is intended that the invention not be limited to the particular embodiments disclosed for carrying out this invention, but will include all embodiments falling within the scope of the appended claims.

What is claimed is:

1. An electronic device, comprising:
   a first electrical battery integrated therewith;
   a second electrical battery in electrical communication with the first electrical battery;
   a motion sensor configured to detect a movement of the electronic device; and
   a processor operably connected to the first electrical battery, the second electrical battery, and the motion sensor, and configured to effectuate charging of the first electrical battery using electrical energy from the second electrical battery only when the electronic device is stationary, based on results of detection performed by the motion sensor.

2. The electronic device of claim 1, wherein the processor is configured to enable charging the first electrical battery using the electrical energy from the second electrical battery only when the electronic device has been stationary for a period of time equal to or exceeding a predetermined threshold duration.

3. The electronic device of claim 1, wherein the motion sensor is configured to generate output data informative of a change in at least one of position and orientation of the electronic device.

4. The electronic device of claim 3, further comprising:
   a transceiver in communication with the motion sensor;
   wherein the processor is programmed to change an operational status of the transceiver in response to the output data received from the motion sensor.

5. The electronic device of claim 3, further comprising:
   a transceiver in operable communication with the motion sensor; and
   electrical circuitry adapted to coordinate an operation of the transceiver;
   wherein the processor is programmed to govern the electrical circuitry to substantially prevent the transceiver from operating in response to the output data, received from the motion sensor, that are indicative of lack of motion of a vehicular key fob.

6. A method for charging a first battery of a vehicular key fob having a processor and a transceiver associated therewith, the method comprising:
   receiving, with the processor, data representing status of motion of the vehicular key fob;
   operating electrical circuitry of the vehicular key fob to effectuate one or more of transferring of electrical charge from a second battery to the first battery when said data indicates that the vehicular key fob has been stationary for a period of time longer than or equal to a threshold duration; and preventing a transfer of electrical charge from the second battery to the first battery when said data indicates that the vehicular key fob is moving.

7. The method according to claim 6, further comprising operating the electrical circuitry, in response to the data received by the processor, to reduce or eliminate supply of electrical energy from either of the first battery and the second battery to the transceiver when the data received by the processor indicates that the vehicular key fob has been stationary for a period of time longer than or equal to the threshold duration.

8. The method according to claim 6, wherein said receiving includes receiving data from a motion detection unit associated with the vehicular key fob and configured to generate such data in response to change in one or more of position and orientation of the vehicular key fob.

9. The method according to claim 6, wherein said transfer includes transferring electrical charge from a replaceable battery to a battery that is integrated with the vehicular key fob.

10. A vehicular system, comprising:
a vehicle having a communication unit adapted to transmit a radio signal identifying said vehicle; and
an electronic device autonomously powered by a first battery and equipped with electronic circuitry that is adapted to poll said radio signal to determine proximity of said electronic device to said vehicle and,
when a period of unchanged operational status of the electronic device exceeds a predetermined duration, effectuate at least one of (i) transferring electrical charge to said first battery, and (ii) ceasing polling said radio signal.

11. The vehicular system according to claim 10, wherein the electronic device includes a motion sensor configured to detect a movement of the electronic device; and
a processor connected to the first battery, a second battery, and the motion sensor, and configured to effectuate said transferring electrical charge only when the electronic device is stationary.

12. The vehicular system according to claim 11, wherein said processor is further configured to cause ceasing said transferring electrical charge when results of detection indicate that the electronic device is moving and at least one of an amplitude and a duration of a movement of said moving exceeds a predetermined threshold value.

13. The vehicular system according to claim 11, wherein said processor is further configured to receive data from the communication unit, the data representing mutual positioning of the electronic device and the vehicle, and
when the data indicates that the electronic device is inside the vehicle, disengage locking a door of the vehicle.

14. The vehicular system according to claim 13, wherein said processor is further configured to override said disengaging in response to a user input applied to the electronic device.

15. The vehicular system according to claim 10, further comprising a second battery, and wherein said transferring electrical charge is effectuated from the second battery to the first battery.

\* \* \* \* \*